June 19, 1934.  M. OSNOS  1,963,243
CONSTANT VOLTAGE SYSTEM
Filed May 9, 1930
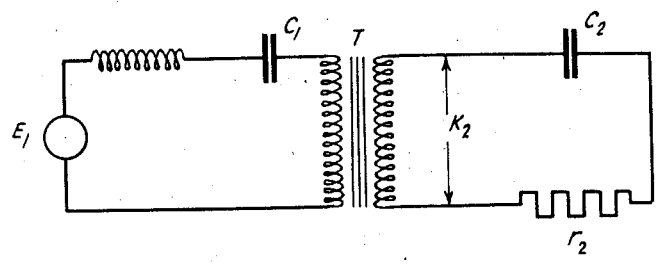
INVENTOR
MENDEL OSNOS
BY
ATTORNEY Patented June 19, 1934

1,963,243

UNITED STATES PATENT OFFICE 1,963,243

CONSTANT VOLTAGE SYSTEM

Mendel Osnos, Berlin, Germany, assignor to Telefunken Gesellschaft fur Drahtlose Telegraphie m. b. H., Berlin, Germany, a corporation of Germany Application May 9, 1930, Serial No. 451,024
In Germany May 11, 1929

2 Claims. (Cl. 171—119)

This invention relates to a constant voltage system.

An object of this invention is to design an electrical network in such a way that the potential value for the load can be made to be independent of the current fluctuations in the load.

Other objects of this invention will be apparent from the following specification when read in connection with the drawing, the single figure of which shows diagrammatically a system designed in accordance with my invention.

In alternating current equipment comprising a transformer T between the consumer or load $r_2$ and the primary electromotive force $E_1$ (see drawing), it is often desirable that the secondary terminal potential $K_2$ should be independent of the load. In other words, the ratio $$\frac{K_2}{E_1}$$

should be entirely independent of the load, or nearly so.

According to this invention, this aim is attained by so choosing the primary and the secondary capacities $C_1$ and $C_2$ that the following equation will be satisfied:

$$y_2 = \frac{x_2(1 - v'_1 v_2)}{2}$$

where $y_2$ is the capacitive reactance of the circuit associated with the secondary winding; $x_2$ is the secondary inductive reactance of the transformer; $x_1$ is the inductive reactance of the primary circuit of the transformer; $y_1$ is the capacitive reactance of the primary circuit of the transformer; $x_{12} = wM$ the ohmic value corresponding to the coefficient M of mutual inductance between the two transformer windings; $v'_1$ the ratio $$\frac{x_{12}}{x_1 - y_1}$$

and $v_2$ the ratio $$\frac{x_{12}}{x_2}.$$

It can be demonstrated that this condition is tantamount to this other condition, i. e., that the primary and the secondary capacities are so chosen that by connecting the secondary capacitive reactance in the secondary circuit, the secondary short-circuit current, under otherwise equal conditions, is doubled or nearly so.

Having now described my invention, what I claim and desire to secure by Letters Patent is the following:

1. In a power network, a primary circuit including reactive elements and the primary of a transformer said primary circuit as a whole having a capacitive reactance of any desired value including zero, a secondary circuit including reactive elements and the secondary of said transformer, said secondary circuit having a capacity reactance which is substantially equal to $$\frac{x_2}{2}\left(1 - \frac{x^2_{12}}{x_1 x_2 - y_1 x_2}\right)$$

where $x_2$ is the secondary inductive reactance of the transformer, $x_{12}$ is the ohmic value corresponding to the co-efficient of mutual inductance between the two transformer windings, $x_1$ is the inductive reactance of the primary circuit of the transformer and $y_1$ is the capacitive reactance of the primary circuit of the transformer.

2. In a power supply network a primary circuit including capacitive reactance and a secondary circuit including capacitive reactance, a transformer for coupling primary and secondary circuits said primary and secondary circuits being related to each other to the extent that the capacity reactance of the secondary circuit is substantially equal to $$\frac{x_2}{2}\left(1 - \frac{x^2_{12}}{x_1 x_2 - y_1 x_2}\right)$$

where $x_2$ is the secondary inductive reactance of the transformer, $x_{12}$ is the ohmic value corresponding to the co-efficient of mutual inductance between the two transformer windings, $x_1$ is the inductive reactance of the primary circuit of the transformer and $y_1$ is the capacitive reactance of the primary circuit of the transformer.

MENDEL OSNOS.